Nov. 10, 1931.    H. J. BURNISH    1,830,783
METHOD OF ELECTRIC ARC WELDING PIPE
Filed Aug. 31, 1929

INVENTOR.
Howard J. Burnish
BY
ATTORNEY.

Patented Nov. 10, 1931

1,830,783

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

METHOD OF ELECTRIC ARC WELDING PIPE

Application filed August 31, 1929. Serial No. 389,654.

This invention relates to a method of electric arc welding and has particular application to the arc welding of longitudinal seams in tubular articles such as pipe.

The object of the invention is to provide a method of arc welding the longitudinal seam of a tubular article wherein a uniform weld will be obtained near the respective ends of the article as compared with the weld at the central portion thereof.

Another object is to obtain uniform penetration of the weld throughout the length of the pipe.

Other objects will appear hereinafter in connection with the preferred embodiment of the invention as illustrated in the accompanying drawings in which the views are as follows.

Figure 1:
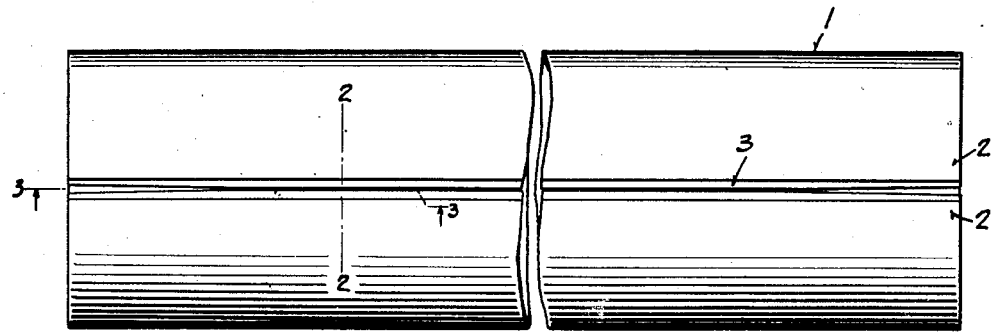
Figure 1 is a top plan view of a pipe blank showing the seam to be welded.
Figure 2:
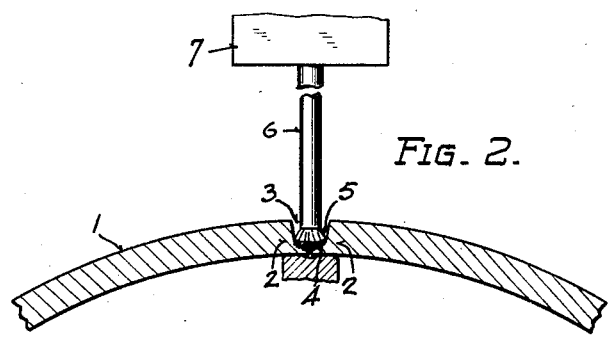
Fig. 2 is a transverse section on line 2—2 of Fig. 1 showing the welding operation.

The pipe blank 1 is preferably formed from a flat sheet of metal, the side edges 2 of the sheet meeting on a longitudinal line of the blank. The edges 2 are chamfered to form a welding groove 3 for receiving deposited welding metal 4.

The welding metal 4 is deposited by means of an electric arc 5 established between a fusible metallic weldrod 6 which furnishes the metal 4, and the edges 2 to be welded.

The metal of the weldrod 6 is projected by the arc into the welding groove 3 and is fused with the metal of the edges 2 to weld the same together. The weldrod is fed to the arc at a rate commensurate with the rate of consumption of the weldrod metal in order to maintain the arc. The feeding of the weldrod is preferably accomplished by employing an automatic feeding mechanism represented as at 7 which is responsive to changing characteristics of the arc to maintain varying rates of feed of the weldrod.

It has been found that these characteristics of the arc are affected by magnetic flux conditions which are established in the pipe or article by the welding current flowing therethrough. It has also been found that the arc is thus affected differently when near the ends of the pipe than when welding in the central portion thereof.

The varying characteristics of the arc which are caused by changing magnetic flux conditions in the pipe interfere with the feeding mechanism 7 in a manner to maintain a different arc length when welding near the ends of the pipe than the welding in the central portion of the pipe. The result is a lack of proper penetration of the weld and a lack of proper fusion of the metal of the weld near the ends of the pipe.

Due to the difficulties above mentioned it has not heretofore been general practice to employ automatic welding machines to weld the entire length of the seam. Instead, where uniform strong welds were required, it has been customary to hand weld the ends of the seams for about nine inches, more or less, depending upon the diameter of the pipe, and then to weld the intermediate portion of the seam by employing automatic welding machines.

The present invention obviates this necessity and enables the employment of automatic welding machines for the full length of the seam without detriment to the quality of the weld.

This is accomplished by spacing the edges to be welded a predetermined amount at each end while maintaining them in closer relation and preferably in contact throughout the intermediate portion of the seam, as shown in Figure 1.

Figure 3:
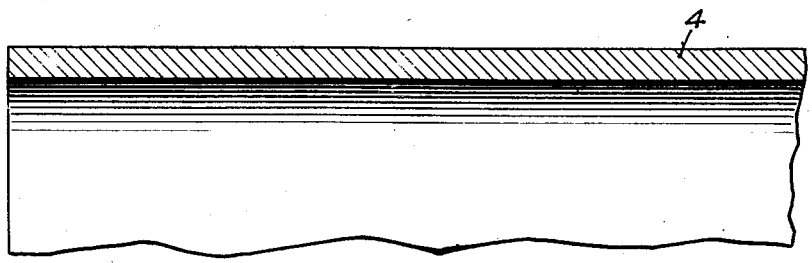
Fig. 3 is a longitudinal section of the finished weld on line 3—3 of Fig. 1.

The increased spacing of the edges at the ends of the seam facilitates the penetration of the weld and thereby provides a uniform penetration of the weld throughout the full length of the seam irrespective of varying characteristics of the arc. This uniform penetration of the weld is illustrated in Fig. 3.

The invention may have various modifications within the scope of the claims.

I claim:

1. The method of electric arc welding longitudinal seams in tubular articles comprising shaping the end portions of an edge to be welded so as to recede from the normal line of the edge, placing the intermediate portion of the two edges forming the seam in welding proximity and causing the receding end portions to form relatively greater spaces between the edges at their ends than between the central portions of the same, and applying an electric arc to progressively weld the edges throughout the full length thereof.

2. The method of electric arc welding longitudinal seams in tubular articles comprising providing a space between the edges to be welded near the ends thereof while maintaining the intermediate portion of the edges in contact, establishing an electric arc between the edges and a fusible metallic weldrod to progressively fuse and weld the edges throughout the length of the seam, and feeding the weldrod to the arc at a rate responsive to changes in characteristics of the arc.

3. In electric arc welding a longitudinal seam in a tubular article, the step of providing a greater separation of the edges at the end portions of the seam than intermediate the said end portions to facilitate maintaining a uniform penetration of the weld throughout the length of the seam.

In witness whereof I have signed my name at Milwaukee, Wisconsin, this 26th day of August, 1929.

HOWARD J. BURNISH.